Feb. 4, 1969 D. F. LEHMAN ET AL 3,426,200

AIR GAP CONDITIONING SYSTEM FOR A RADIATION GAUGE

Original Filed Jan. 12, 1959

INVENTORS
DON F. LEHMAN,
DONALD E. VARNER

By Anthony D. Germano

United States Patent Office 3,426,200
Patented Feb. 4, 1969

3,426,200
AIR GAP CONDITIONING SYSTEM FOR
A RADIATION GAUGE
Don F. Lehman, Columbus, Ohio, and Donald E. Varner,
Hanover, Mass., assignors to Industrial Nucleonics
Corporation, a corporation of Ohio
Continuation of application Ser. No. 786,381, Jan. 12,
1959. This application Ser. No. Jan. 16, 1967, Ser. No.
609,688
U.S. Cl. 250—83.3     7 Claims
Int. Cl. G01t 1/16; G01b 15/02

This is a continuation of a copending application Ser. No. 786,381, filed Jan. 12, 1959, and now abandoned.

This invention relates generally to radiation gauging apparatus of the type used for non-contacting thickness measurements of a continuous sheet and more specifically it relates to method and means for preventing errors due to adverse temperature changes in the vicinity of said measurements.

The thickness or density of continuously produced sheet material such as paper, plastic, metals, etc., is being measured in industrial processes by radiation gauging apparatus. Generally, the material is subjected to penetrative radiation and the radiation returning from said material is detected. The thickness or density at the point of measurement may be directly correlated to the amount of energy detected. Apparatus of this character is generally classified in two categories: a transmission type in which radiation passing through the material is detected; and a reflection type in which back-scattered radiation is detected. In either case these gauges are capable of a high degree of accuracy so that differences in the radiation absorption coefficient of the gap medium between the source and detector may cause significant errors in measurement. For example, if it is assumed that the gap medium is air and that the ambient temperature thereof is at a predetermined value, then the density of the air gap will be of a certain value. However, due to the inducement of vigorous molecular activity, increases in gap temperature cause corresponding reductions in the air gap density. A corresponding increase in detected radiation occurs due to the reduced air gap absorption coefficient. Accordingly, the measurement of the material will be erroneous to the extent that the indicated thickness will be less than the actual thickness. Conversely, a reduction in air gap temperature will result in thickness indications greater than is actually the case.

Previous attempts to eliminate the adverse effects of gap temperature change on measuring accuracy consisted of means responsive to ambient atmospheric conditions for automatically varying the relative position of the radiation source with respect to the detector. Usually various contractable and expandable mechanical expedients which translated variables in atmospheric pressure, temperature and relative humidity were operative to physically position the radiation source. These devices were unsatisfactory in that the complex arrangement of bellows, springs, levers, and mechanical linkages afforded varying degrees of reliability. Furthermore, since the length of the air gap is quite critical in view of the inverse square law, a slight error in relocating the source would be magnified at the detector. It has been found that with recent developments in radiation measuring techniques that ambient temperature changes have a significantly greater influence on industrial measuring applications than the inevitable changes in atmospheric pressure and/or relative humidity.

Industrial processes involved in continuous sheet production oftentimes are required to drastically reduce the line speed for purposes of repair or alteration. When line speed is reduced, the temperature of the air about the sheet will necessarily increase due to the loss of cooling air currents. The response of a radiation gauge disposed adjacent said sheet will be noticeably affected. The effect is even more pronounced if the produced sheet exhibits a temperature substantially above that of the surrounding atmosphere; this is quite often the case in many modern day industrial operations of the continuous production type.

Apparatus of the present invention has particular utility in combination with a radiation gauge of the reflection type used for measuring extremely thin sheets of metal, e.g., a layer of tin coating deposited on a steel sheet. Other embodiments may be suggested, but the example chosen will explicitly illustrate almost every utilitarian aspect of the present invention. Accordingly, apparatus is provided to direct a continuous stream of heated air into the gap between the coated surface of the traveling sheet and the inspection head of the gauge. Specifically, a circular manifold is concentrically mounted on the face of the inspection head about the radiation window through which both incident and reflected radiation pass. The manifold contains a plurality of holes on the inner periphery thereof so that heated air may be forced therethrough to occupy the entire air gap. In this manner, by fixing the air temperature at a predetermined value and maintaining that value during the measuring operation, the mass of air in the gap is maintained substantially constant.

Accordingly, it is a primary object of the present invention to provide a novel method and means for stabilizing the measurements of a radiation thickness gauge subjected to adverse variations in atmospheric temperature.

It is another object of the present invention to provide apparatus for stabilizing the temperature variable measurements of a radiation thickness gauge which does not depend on moving mechanical components subject to wear.

It is also an object of the present invention to provide apparatus for stabilizing the temperature variable measurements of a radiation thickness gauge whereby said gauge is enabled to accurately measure materials of substantially lesser cross-sectional dimension than heretofore possible with prior art devices.

It is a further object of the present invention to provide apparatus for stabilizing the temperature variable measurements of a radiation thickness gauge that is not critical to adjust and which affords reproducibility of measurement not attainable in prior art devices.

It is yet another object of the present invention to provide apparatus for stabilizing the temperature variable measurements of a radiation thickness gauge that is simple in construction and extremely economical to maintain.

It is an additional object of the present invention to provide apparatus for stabilizing the temperature variable measurements of a radiation thickness gauge that may be readily adapted to any of said gauges which are presently commercially available.

Further advantages and features of the present invention will become apparent when the following disclosure is viewed in conjunction with the appended drawings, in which.

Figure 1:
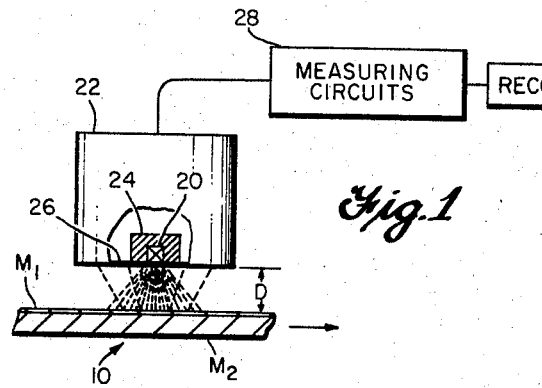
FIG. 1 is a simplified diagrammatic view of radiation gauging system in which apparatus of the present invention has particular utility.

Referring now to the drawings and specifically to FIG. 1 there is shown a reflection gauging system for determining the coating thickness of a sheet 10. In a typical instance, the sheet 10 may comprise a base material $M_2$, such as steel strip, and a tin coating $M_1$ fixedly secured thereto by either a conventional hot dip or an electrolytic process. In either case, the resultant plated material must be heated to a temperature substantially above that of the surrounding atmosphere in order to properly bond the two substances. To measure the thickness of tin coating $M_1$, a radiation source 20 is mounted in the center of one base of a cylindrical radiation detector such as an ionization chamber 22. Lead shielding at 24 encloses the source 20 execpt for an opening which allows radiant energy to be directed downward toward the sheet 10.

The position of the ionization chamber 22 is usually maintained a fixed distance D from the sheet 10 during the period of measurement. A thin stainless steel window 26 is secured to one end of the chamber 22 and adapted to readily admit reflected radiant energy into the chamber. Further features of construction are herein omitted since details thereof are quite well known to those skilled in the art. Suffice it to say, that the detector 22 generates an electrical signal in response to the radiation returned from the sheet 10. Conventional measuring circuitry at 28 is adapted to receive and amplify this developed signal in order to operate a recorder generally at 30. Recorder 30 may be of the strip-chart type for graphically displaying thickness measurements of the tin coating $M_1$.

In the operation of this system, if the thickness of the base material $M_2$ is of a predetermined value, variations in its cross-sectional dimension will not significantly alter the amount of radiation reflected toward the chamber 22. (This quantity is commonly referred to as an "infinite thickness" of absorber.) But the detector will be sensitive to variations in coating thickness, the amount of returned radiation being inversely proportional to the cross-sectional dimension of the material $M_1$ if the density of the coating $M_1$ remains constant.

The returned radiation represents only a portion of the total energy incident upon the sheet 10; the remainder is absorbed by said sheet and the gap medium through which the incident radiation passes. In addition, a portion of the energy reflected from the sheet is also absorbed and scattered by the gap medium. It becomes readily apparent then, that, if an extremely thin layer of material $M_1$ is measured, the gap medium may absorb a significant proportion of the total attenuated radiation, thereby becoming a significant factor in said measuring operation. Since atmospheric variations in the temperature of said gap medium, which in the usual case is air, cause proportional changes in the density thereof, the mass of the air gap will change accordingly. Inasmuch as the gap temperature will usually rise above a nominal value, the resulting increase in detector response may be interpreted as a decrease in thickness of the coating which may, in fact, remain absolutely constant.

Accordingly, the error of measurement may be quite large especially if conditions are such that the air gap experiences a wide range in ambient temperature. This is a quite common occurrence in continuous industrial processes wherein the line speed must be frequently varied to permit shearing, welding and other operations on the product. It may be observed that, in the example cited, a reduction in linear velocity of the sheet 10 past the detector 22 will cause the temperature to build up in the air gap due to the lack of cooling convection currents afforded by a faster moving sheet.

Figure 2:
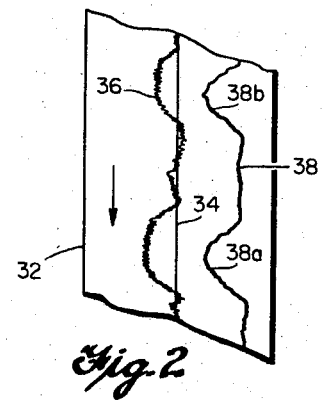
FIG. 2 is a view of a section of chart paper illustrating the influence of air gap temperature upon the response of the system of FIG. 1.

Referring to FIG. 2, a section of chart 32 produced by the recorder 30 may be observed to graphically illustrate the effects of air gap temperature on the measurements of said coating. The longitudinal dimension of the chart 32 may be divided in units of time while its lateral dimension may correspond to units of thickness. Assuming a somewhat hypothetical situation wherein the thickness of the coating $M_1$ remains constant for a substantial period of time, a straight line 34, which is indicative of this constant thickness value, may be scribed upon the chart 32. The measured coating thickness as indicated by the recorder 30 is represented by the variable trace 36. For purposes of comparison, another line 38 may be superimposed upon the graph to indicate concomitant temperature changes of the measuring gap. Thus, it may be observed that increases in gap temperature as indicated at 38a and 38b are accompanied by an erroneous indication of coating thickness.

Figure 3:
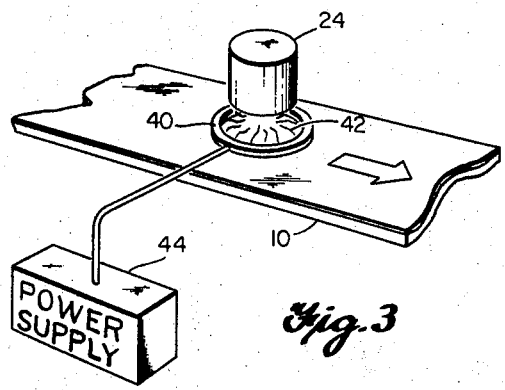
FIG. 3 is a diagrammatic perspective view illustrating the essential concept taught by the present invention for improving the system in FIG. 1.

In order to continuously provide accurate measurements of the coating $M_1$ under these adverse circumstances, it is proposed to stabilize the density of the air column above the measured area. And, since gap temperature is by far the most significant factor affecting gap density, control thereof should produce a measuring gap having a regular weight per unit volume. In FIG. 3, apparatus as taught by the present invention utilizes the simple expedient of warming the gap medium to a predetermined temperature by means of a heating element 40 thereby producing an atmosphere of substantially constant mass cross-section. The heating element 40 should be concentrically arranged about the point of measurement and positioned between the detector 22 and the sheet 10. The heating element 40 may be any chemical, electrical or mechanical device operative to convert power from a source 44 to heat energy. However, the design and capacity of said element should be adjusted to maintain a given gap temperature regardless of temperature changes of the adjacent atmosphere. The flow of heat energy indicated at 42 should be directed toward the center of the measuring area so as to effectively permeate the entire air gap.

Figure 4:
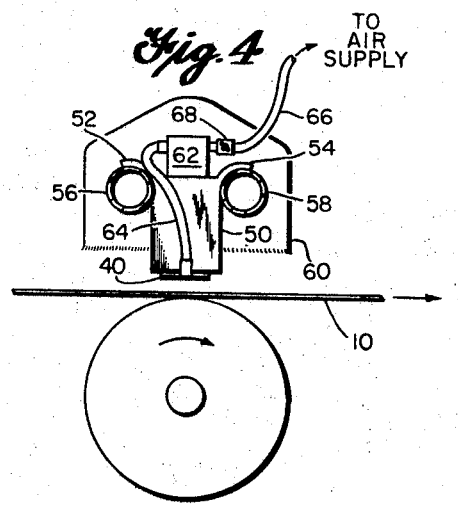
FIG. 4 is an end elevational view of an industrial type nuclear radiation reflection gauge utilizing a novel measuring gap heating system comprising a preferred embodiment of the present invention.

Specifically speaking, a useful embodiment of the present invention is suggested in FIG. 4. Referring now to FIG. 4, a reflection type radiation gauge utilizes a source-detector housing 50 having a pair of curved arms 52 and 54 provided on the upper portion thereof in engagement with a pair of horizontally aligned tubular rails 56 and 58. The rails 56 and 58 are in turn secured to an end bracket 60. The source-detector unit 50 extends downwardly from said rails in suspended relation to the plated sheet 10. Inasmuch as a radiation gauge of the type briefly set forth hereinabove is adequately described in a copending application for U.S. Letters Patent, Ser. No. 662,672, filed May 31, 1957, by George B. Foster, et al., now Patent No. 2,951,161 further details in the construction thereof are omitted from the present specification.

A heating manifold 40 is mounted on the underside of the source-detector unit 50. A sealed heating unit 62 is placed upon the souce-detector unit and is connected to the heat manifold 40 by a conduit 64. Another conduit 66 connects the input of the heating unit 62 to any convenient supply of air. Adjustable valve means 68 may be inserted into the air line 66 to control the volume of air admitted to the heating unit 62 per unit of time. The heating unit 62 may include either electrical or gas-operated heating elements for warming air admitted to the interior of said unit. In addition, the heating unit 62 should be adequately insulated to prevent heat loss. Warmed air is then exhausted through the conduit 64 and supplied to the manifold 40.

Figure 5:
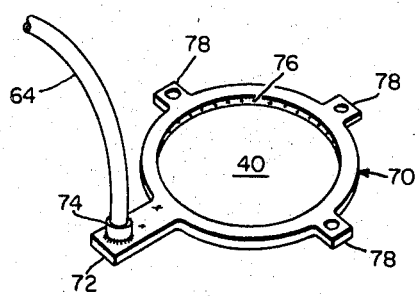
FIG. 5 is a perspective view showing details of the gap heating manifold shown in FIG. 4.

In FIG. 5, the constructional details of the heat manifold 40 are clearly shown. A generally circular ring 70 of steel tubing is formed with a hollow metal flange 72 extending outwardly from the periphery of said ring. A single opening is provided in the outer periphery of the ring in alignment with the hollow interior of flange 72. The upper surface of flange 72 is fabricated with a pipe coupling 74 for receiving the exhaust conduit 64. The inner periphery of ring 70 is perforated at 76 thereby providing the only outlet for hot air forced into the conduit 64. In addition, a set of mounting ears 78 are spaced about the circumference of the ring 70. It may be desirable to flatten the tubing 70 to reduce the thickness dimension of the manifold; the possibility of interference with the normal travel of the sheet 10 over the roll is substantially eliminated by this method of construction.

Figure 6:
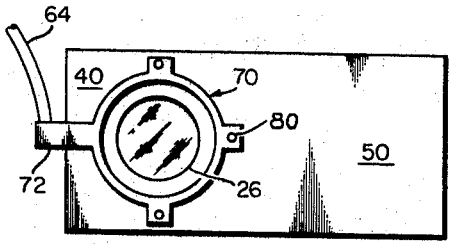
FIG. 6 is a bottom view of the source-detector unit of the gauge illustrated in FIG. 4 in which the relative position of the heating manifold with respect to the radiation aperture is clearly shown.

Now, with reference to FIG. 6, the window 26 of the ionization chamber is exposed through an aperture in the face of the source-detector unit 50. The inner diameter of the ring 70 is of slightly larger diameter than the radiation aperture which it surrounds. Bolts at 80 are adapted to extend through the ears 78 and engage tapped holes in the face plate of the source-detector housing 50.

In the operation of this system, air is heated in the unit 62 and expelled through the holes 76 into the measuring gap. The rate of air flow may be controlled by the valve 68 so that the temperature of the heated air may be adjusted to a predetermined value. As a safety measure in case of obstruction of the air flow, thermostat means may be located in the heating unit 62 to disconnect the heat generator when the interior temperature of the unit 62 exceeds a preset value. It may be noted that electric heaters may be advantageously employed in the unit 62 due to their efficiency and ease of control.

Alternately, the heating element 40 may comprise a thermo-resistive element connected to a source of electric power for directly heating the gap medium. However, the efficiency of this method is considerably less than that afforded by the apparatus disclosed hereinabove.

While the present invention has been described with reference to a preferred embodiment, it should be undertood that several changes, additions, and omissions may be made therein without departing from the spirit and scope of the present invention or sacrificing any of its attendent advantages.

What is claimed is:

1. Measuring apparatus comprising a radiation source providing radiation toward a sheet material to be measured, a radiation detector for detecting radiation from said material, said radiation source and detector defining with said sheet a measuring gap through which said radiation passes, a manifold fixedly positioned about the outer limits of said measuring gap and substantially surrounding said gap, said manifold having a plurality of spaced openings in communication with said measuring gap, means for generating heated air, means for passing said heated air into said manifold, and means for discharging said heated air from said exhaust ports to maintain said measuring gap at a substantially constant temperature.

2. In an apparatus employing a nuclear source of radiation and a radiation detector for gauging a sheet material by directing a beam of penetrative radiation from said source toward said sheet from one side of the same and quantitatively detecting radiation from said sheet to provide an indication of a variable property thereof, said radiation source and detector defining with said sheet a measuring gap through which said radiation passes, means for preventing error in measurement due to temperature changes of said measuring gap, comprising a manifold positioned concentrically about said gap and substantially surrounding said gap, said manifold having a plurality of inwardly directed exhaust ports, means for generating heated air, means for passing said heated air into said manifold, and means for discharging said heated air from said exhaust ports to maintain the temperature of said measuring gap substantially constant.

3. Apparatus for gauging a sheet material by directing a beam of penetrative radiation toward said sheet from one side of the same and quantitatively detecting radiation from said sheet to provide and indication of a variable property thereof, comprising a source-detector assembly including a radioactive source for providing said radiation beam, a radiation detector having an output functional of radiation from matter in the path of said beam, and a common supporting structure for said source and said detector; means for positioning said source-detector assembly in spaced relation to said sheet, said radiation source and detector defining with said sheet a measuring gap through which said radiation passes, a thermoelectric element in the shape of a substantially closed loop for generating heat energy, means for mounting said thermoelectric element on said source-detector assembly in concentric relation with said radiation source and said radition detector whereby said loop substantially surrounds said air gap, a source of electric power, means for connecting said thermoelectric element to said power source, and means for radiating heat energy produced by said thermoelectric element.

4. Apparatus for gauging a sheet material by directing a beam of penetrative radiation toward a surface of said sheet from one side of the same and quantitatively detecting radiation from said sheet to provide an indication of a variable property thereof, comprising a source-detector assembly, including a radioactive source for providing said radiation beam, a radiation detector having an output functional of radiation from matter in the path of said beam, and a common supporting structure for said source and said detector; means for positioning said source-detector assembly in spaced relation to said sheet, a manifold comprising a hollow annulus having a plurality of openings spaced on the inner periphery thereof, said annulus further including an inlet communicating with the hollow interior of said annulus, means for mounting said manifold on said source-detector assembly in concentric relation with said radiation source and said radiation detector, a supply of air including a thermal unit for heating air admitted thereto, said thermal unit having an input and an output, means for connecting the input of said thermal unit to said air supply, means for connecting the output of said thermal unit to said manifold, and means for discharging said heated air through the openings in said manifold.

5. Apparatus for gauging a sheet material by directing a beam of penetrative radiation toward a surface of said sheet from one side of the same and quantitatively detecting radiation from said sheet to provide an indication of a variable property thereof, comprising a source-detector assembly, including a radio-active source for providing said radiation beam, a radiation detector having an output functional of radiation from matter in the path of said beam, and a common supporting structure for said source and said detector; means for positioning said source-detector assembly in spaced relation to said sheet, said radiation source and detector defining with said sheet a measuring gap, a manifold comprising a hollow annulus having a plurality of openings spaced on the inner periphery thereof, said annulus further including an inlet communicating with the hollow interior of said annulus, means for mounting said manifold on said source-detector assembly in concentric relation with said radiation source and said radiation detector, a supply of air including a thermal unit for heating air admitted therein, said thermal unit having an input and an output, adjustable valve means, means for connecting said valve means between the input of said thermal unit and said air supply to regulate the rate of air flow therefrom, means for connecting the output of said thermal unit to said manifold, and means for discharging said heated air through the openings in said manifold to maintain the temperature of said measuring gap at a substantially constant value.

6. Apparatus substantially as set forth in claim 5 in which said thermal unit comprises a sealed housing, at least one thermoelectric element for supplying heat energy to the interior atmosphere of said housing, a power supply, and means for connecting said power supply to said thermoelectric element.

7. Apparatus substantially as set forth in claim 5 in which said valve means is adjusted to produce and maintain a temperature of said measuring gap not lower than that which would be produced during the normal measuring operation of the gauge.

References Cited

UNITED STATES PATENTS

| 2,800,591 | 7/1957 | Gilman | 250—83.3 |
| 2,809,638 | 10/1957 | Molins | 250—83.3 |
| 2,883,555 | 4/1959 | London | 250—83.3 |
| 2,884,537 | 4/1959 | Swift | 250—83.3 |

ARCHIE R. BORCHELT, *Primary Examiner.*

U.S. Cl. X.R.

250—83.6